United States Patent [19]

Bartlett et al.

[11] Patent Number: 4,526,763

[45] Date of Patent: Jul. 2, 1985

[54] PROCESS FOR THE PRODUCTION OF ALUMINA

[75] Inventors: Robert W. Bartlett; Thomas R. Bolles, both of Tuscon, Ariz.

[73] Assignee: Atlantic Richfield Company, Los Angeles, Calif.

[21] Appl. No.: 373,874

[22] Filed: May 3, 1982

[51] Int. Cl.³ .............................................. C01F 7/26
[52] U.S. Cl. .................................... 423/112; 423/114; 423/122; 423/128
[58] Field of Search ................ 423/112, 114, 122, 128

[56] References Cited

U.S. PATENT DOCUMENTS

| | | | |
|---|---|---|---|
| 1,752,641 | 4/1930 | Kjellgren | 423/114 |
| 1,948,888 | 2/1934 | Sanders | 423/114 |
| 1,960,320 | 5/1934 | Steuart | 423/114 |
| 2,354,133 | 7/1944 | Lyons | 423/114 |
| 2,467,271 | 4/1949 | Peer | 423/114 |
| 3,226,187 | 12/1965 | Bretsznajder et al. | 423/128 |
| 3,320,032 | 5/1967 | Feller | 423/112 |
| 4,377,566 | 3/1983 | Bachelard et al. | 423/631 |

Primary Examiner—H. T. Carter
Attorney, Agent, or Firm—F. Lindsey Scott

[57] ABSTRACT

In a process for the production of alumina from aluminous raw material, an ammonoalunite intermediate is formed. The raw material is preferably a clay which is leached with sulfuric acid to form an aluminous solution which is separated from the solid materials. After any required extraction of iron, such as by liquid ion exchange, the solution is subjected to elevated temperatures and pressures in the presence of ammonium ions to form ammonoalunite which is recovered as a precipitate. The liquor is recycled to leach the clay, while the ammonoalunite is thermally decomposed to alumina. Gases liberated during decomposition are scrubbed with recycled liquor to form clay leach liquor. The alumina may be purified by washing with sulfuric acid to obtain a purity suitable for aluminum electrolysis.

15 Claims, 6 Drawing Figures

PROCESS FOR THE PRODUCTION OF ALUMINA

FIELD OF THE INVENTION

This invention relates to the production of alumina. More particularly, this invention is concerned with a process for the recovery of alumina from aluminous raw materials, especially clays. One of the uses of the alumina is in the electrolytic production of aluminum.

BACKGROUND OF THE INVENTION

Much of the world's metallic aluminum is obtained from bauxite ores, which are composed essentially of aluminum hydrates, either gibbsite or boehmite. The United States has limited deposits of bauxite so that the development of alternative aluminum sources in this country is desirable to reduce any dependence upon foreign sources of the metal.

Many clays contain as much as 30–40% alumina and consequently are potential sources of alumina, but the known processes for recovering alumina from clays are usually of marginal economy. The cost of obtaining aluminum from local sources may, in some cases, not be competitive with the cost of imported material. To be economic, an alumina plant must have a very large capacity and be supported by an adequate supply of ore for processing. The process used must minimize energy consumption, maximize alumina yield and recycle reagents to reduce the cost of raw materials. These plants are very capital intensive and for this and other reasons mentioned above, it is highly desirable to reduce the cost of processing the ore.

In the extraction of alumina from alumino silicates such as clays, it is especially critical that the process be energy efficient; otherwise it is not economical to use a clay as the source material.

The extraction process usually involves the preparation of an intermediate aluminum compound from which alumina can be generated. This intermediate is usually the key to the process, since a number of characteristics of the process intimately associated with the intermediate determine the viability of the process. These characteristics include: the yield of alumina; the energy requirements; the ease of separating impurities; and the ability to recycle reagents for use in other steps of the process. In some processes, the intermediate is produced in a physical form which is difficult to handle and separate; in others it is necessary to use substantial amounts of energy to concentrate the intermediate by evaporation. In still others, it is difficult to separate the intermediate from impurities such as sodium and potassium and recover in the intermediate an acceptably large proportion of the aluminum which was present in the raw materials.

Processes for the extraction of alumina from alumino silicates, such as clays, are known. Many of these processes involve leaching the aluminum content from the raw material with an aqueous solution of a mineral acid, separating the resultant soluble aluminum compound from the insoluble silicate solids and reacting the compound to form an intermediate which can be converted into cell grade alumina. At some stage in the process, impurities such as sodium, potassium and iron must be separated from the alumina.

The three common mineral acids; hydrochloric, nitric and sulfuric acids have been used as leach acids. Hydrochloric acid has been used with some success to produce the chloride intermediate by crystallization but the corrosive nature of this acid requires rather exotic, and consequently expensive, plant construction materials. Sulfuric acid has been used to leach aluminum as aluminum sulfate into solution, but these processes have generally not been sufficiently economic. In sulfuric acid processes it is known to convert the sulfate under elevated temperature and pressure into an alunite intermediate, analogous to the naturally occuring mineral alunite, $KAl_3(SO_2)_4.(OH)_6$. In U.S. Bureau of Mines Report of Investigation 7162, 1968, synthetic solutions comprising sodium sulfate, sulfuric acid and aluminum sulfate, and representing the leach solution of a low grade aluminum silicate, were autoclaved to produce a natroalunite precipitate which was washed and subsequently calcined to alumina. However, the alunite in this process suffers from the disadvantage of being a sodium compound. Since the product alumina must not contain a significant amount of sodium it is undesirable to use a sodium intermediate such as natroalunite. This increases the overall cost of the process and it is more difficult to remove the relatively large quantity of sodium derived from the sodium intermediate than to remove small quantities of sodium which may be present in the raw material.

It is also known to convert the sulfate to a basic aluminum sulfate, hydrogen alunite, which is similar to natural alunite but has hydronium ions substituted for potassium ions. In Extractive Metallurgy of Aluminum, Volume 1, pp. 305–332, 1963, aluminum sulfate solutions derived from leaching low grade bauxites with sulfuric acid solution were autoclaved at 180° to 280° C. to precipitate basic aluminum sulfate crystals, $3Al_2O_3.4SO_3.9H_2O$. In U.S. Pat. No. 4,244,928, the ore is subjected to a two stage sulfuric acid leach, the first under pressure and a lower acid concentration than the second. The sulfate is hydrolyzed under pressure to basic aluminum sulfate. While these processes avoid the contamination introduced by using alkali metal intermediates, hydrogen alunite intermediate processes require high temperatures and pressures and the yield of alunite is too low.

Other known processes use sulfuric acid or a sulfate to leach the aluminous raw material and form an alum intermediate. In U.S. Bureau of Mines Report of Investigations 6290, 1963, clay is leached with a solution of sulfuric acid and potassium sulfate to produce normal alum, $K_2SO_4.Al_2O_3.3SO_3.24H_2O$, which is crystallized, separated and autoclaved to produce basic alum, $K_2SO_4.3Al_2O_3.4SO_3.9H_2O$. This is said to avoid processing difficulties when calcining normal alum to form alumina. However, the process also has the disadvantage mentioned above of introducing alkali metal ion contaminant into the process.

U.S. Bureau of Mines Report of Investigations 6573, 1965, discloses a process wherein clay is calcined with ammonium bisulfate or baked with ammonium sulfate to form ammonium alum which is twice crystallized and redissolved before being treated with ammonium hydroxide to produce alumina trihydrate.

U.S. Pat. Nos. 1,677,157 and 1,752,599, also disclose processes where treatment with ammonium sulfate forms ammonium alum which is separated by crystallization. In the former, the alum is reacted with ammonia liberated during alum formation to produce ammonium sulfate for recycling and hydrated alumina. In the latter, initial sulfatization with ammonium sulfate is carried out in an oxygen-free atmosphere containing gases produced by dissociation of the sulfate. The alum is converted to aluminum sulfate in an atmosphere which absorbs product ammonia as a reusable ammonium salt and the liquor from alum formation is reacted with ammonia to recover additional aluminum as the hydroxide.

All these alum processes suffer from the disadvantage of requiring crystallization of the alum intermediate. Aluminum sulfate solutions, when crystallized, form various hydrated alum compounds such as $Al_2(SO_4)_3.18H_2O$ aluminum sulfate (alum); $NH_4Al(SO_4)_2.12H_2O$ ammonium alum; and $KAl(SO_4)_2.12H_2O$ potassium alum. These alum crystallization processes require considerable energy to recover and calcine the intermediate and to regenerate acid for leaching and they are therefore costly.

There is a need, therefore, for a process for extracting aluminum from low grade materials such as clays which is economic and involves convenient, efficient, lower energy consuming process steps which provide easily handleable intermediates recovering a high proportion of the aluminum in the raw material without alkali or other major metal contamination.

SUMMARY OF THE INVENTION

We have now found that alumina of a purity suitable for supplying a Hall-Héroult electrolytic reduction cell may be produced by a comparatively direct and low energy process which reduces both capital and operating costs from those of prior processes. Such alumina is produced by this invention from aluminous raw materials via a synthetic ammonoalunite in a process which provides desirable economics in plant equipment, raw materials and energy consumption together with improved yields of alumina. Ammonoalunite is the ammonium analogue of a natural mineral, alunite. This latter mineral has the formula $KAl_3(SO_4)_2(OH)_6$ and in ammonoalunite a ammonium ion substitutes, for the potassium ion in this formula. Ammonoalunite therefore has the formula $NH_4Al_3(SO_4)_2(OH)_6$.

According to the invention there is provided a process for the extraction of alumina from aluminum-containing raw materials, which comprises forming an ammonoalunite intermediate.

The process of the invention comprises the steps of leaching aluminous raw material, such as clay, with an aqueous solution containing sulfuric acid to extract aluminum into the solution, reacting the aluminous solution in the presence of ammonium ions to precipitate the ammonoalunite and thermally decompose it to alumina. Much of the sulfuric acid needed for leaching is regenerated in the precipitation step which is a hydrolysis reaction. Ammonia and the remaining sulfate are recovered, by scrubbing the ammonoalunite decomposition gases, and recycled to the leaching step.

The aluminous raw material in the process of the invention is preferably an alumino-silicate such as kaolinite clay or calcined kaolinite clay, for example metakaolin.

In preferred embodiments of the invention, the aluminous raw material is crushed and ground to a particle size suitable for leaching. The leach liquid comprises a solution of sulfuric acid and ammonium sulfate which are substantially obtained by recycling reagents from subsequent steps in the process so as to reduce the cost of raw materials. Aluminum is extracted as soluble sulfate into the leach liquid which is separated from insoluble materials. Desirably, the solution is treated to remove dissolved iron and suspended solids. The resultant liquor is fed to an autoclave together with additional ammonia if necessary to provide an appropriate reactant ratio. Reaction under elevated temperature and pressure produces sulfuric acid, which is recycled to the leaching step, and ammonoalunite which is obtained as a precipitate. The ammonoalunite is decomposed by heating, liberating sulfur oxides and ammonia which are scrubbed and recycled to the leaching step, and forming alumina which may be purified by washing.

Thus, the intermediate product, ammonoalunite, is produced by pressure hydrolysis and subsequently calcined to produce alumina of good purity. Hydrolysis of the acidic aluminum sulfate solution produced by acid leaching readily forms the ammonoalunite in the presence of ammonium ions. In the absence of alkali or ammonium ions, hydrogen alunite, or basic aluminum sulfate, would be produced. However, the yield of this intermediate is too low at reasonable temperatures and pressures. Usually, the aluminous liquor must be recycled in the hydrogen alunite processes to increase the yield of that intermediate. This results in increased energy consumption. This invention uses lower autoclave temperatures and produces a higher alunite yield than the hydrogen alunite process. Although the use of sodium and potassium ions provides an alkali alunite which may be recovered by precipitation at reasonable temperatures and pressures, thermal decomposition of alkali alunite leaves alkali contamination in the alumina which is difficult, if not impossible, to adequately remove during calcination of the alumina.

In contrast, the ammonoalunite, when thermally decomposed, releases both ammonia and sulfur oxides as readily recoverable and reusable gases. We have found that the synthetic ammonoalunite, an analog of the natural mineral alunite, can be obtained in high yields at modest temperatures, for example from 150° to 250° C. Subsequently, the ammonoalunite can be decomposed using less energy than the various aluminum sulfate solids produced in other sulfuric acid processes and the ammonium ion can be eliminated conveniently by heating it to a gaseous species. Ammonoalunite decomposition has a relatively low energy requirement as compared to other aluminum compounds. This factor makes this process economically more attractive than other alternates.

DETAILED DESCRIPTION OF THE PREFERRED EMBODIMENTS

Figure 1:
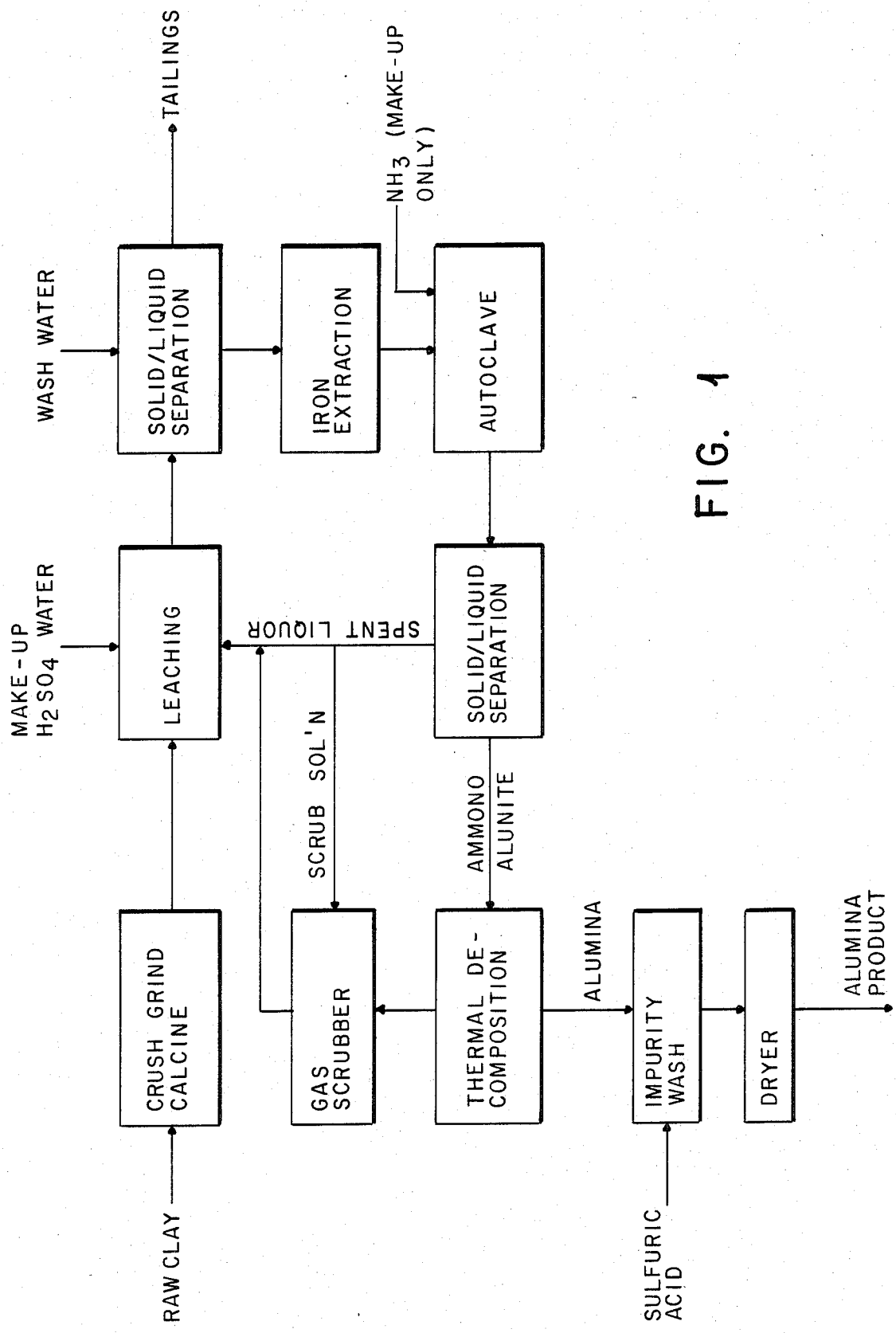

One embodiment of the process of the invention is shown in the flow diagram in FIG. 1, and comprises the following steps:

(1) Sulfuric acid leaching of calcined kaolin clay.
(2) Solid/liquid separation of undissolved leach residue.
(3) Separation of iron from leach liquor by known means such as liquid ion exchange.
(4) Hydrolysis precipitation of ammonoalunite.
(5) Solid/liquid separation of ammonoalunite and recycle of solution to leach.
(6) Decomposition of ammonoalunite to solid alumina, gaseous ammonia, water and oxides of sulfur, which are recycled to leach.
(7) Purification of the alumina product by washing with sulfuric acid solution.

Initially, raw clay is crushed, ground and optionally calcined before being leached with sulfuric acid, preferably at a temperature of from 70° C. to 130° C., for example about 85° C. The leach liquor preferably also contains ammonium sulfate provided by recycling reagents from subsequent stages in the process as will be described below.

It is proposed that the process chemistry based on calcined clay feed is as shown in the following equations (1)–(8) which are discussed below.

The reaction in the leaching step is believed to be:

$$9H_2SO_4 + 3Al_2O_3 \cdot 2SiO_2 = 3Al_2(SO_4)_3 + 9H_2O + 6SiO_2 \quad (1)$$

Residue left over from leaching and consisting predominantly of silica, is separated from the aluminum-containing liquor. The liquor is treated to extract iron compounds by known techniques, such as liquid ion exchange.

The feed solution preferably contains at least 25 gpl, for example 30 to 100 gpl, more preferably 25 to 65 gpl, more preferably 30 to 65 grams per liter dissolved $Al_2O_3$, and ammonium ion provided by the presence of ammonium sulfate. Ammonia can be added to the feed solution or directly to the autoclave to make up an appropriate reactant ratio. Desirably the molar ratio of $NH_3$ is dissolved $Al_2O_3$ is from about 0.33:1 to 3:1, preferably 1:1 to 3:1. Of course, all the ammonia requirement could be supplied to the feed solution or directly to the autoclave, but it is considerably more economical to recycle ammonia.

The reactants in the autoclave are subjected to elevated temperature and pressure to prepare the ammonoalunite and regenerate sulfuric acid according to the following equation:

$$3Al_2(SO_4)_3 + (NH_4)_2SO_4 + 12H_2O = 2NH_4Al_3(SO_4)_2(OH)_6 + 6H_2SO_4 \quad (2)$$

Preferably, the reaction temperature is from 150° to 250° C., more preferably from 180° to 220° C., most preferably from about 200° C., and pressure in the reactor may be from 35 to 575 psia (0.24 to 3.96 MPa), preferably from 225 to 575 psia. The residence time of the reactants in the autoclave is a factor in the efficiency of reaction. As will be explained more fully below, short residence times have been found to be adequate. Preferably the residence time is at least ¼ hour, for example ¼ to 3 hours, more preferably ½ to 1 hour.

The ammonoalunite intermediate is formed as a precipitate in a hydrolysis reaction which also precipitates some of the impurities that are leached from the clay; therefore, subsequent product purification may be required. The precipitate may be recovered readily and with less energy than an intermediate requiring evaporative treatment. The separated liquor is recycled for use in leaching the clay. This not only recycles sulfuric acid but also has the advantage of recycling any soluble alumina which was not precipitated.

The ammonoalunite is then thermally decomposed, according to the following equation:

$$2NH_4Al_3(SO_4)_2(OH)_6 \xrightarrow{heat} 3Al_2O_3 + 2NH_3 + 7H_2O + 4SO_3 \quad (3)$$

As temperature increases and decomposition begins ammonia and water are first driven off and collected for recycling. The temperature in this step should not be so high as to decompose the ammonia otherwise substantial losses of the gas will occur and the cost of the process will be increased. With a further increase in temperature sulfur oxides are driven off and collected for recycling. These decomposition steps may be effected in single or multiple reactors.

Preferably, final decomposition is effected at a temperature of up to 1200° C., to provide alumina and by-product gases comprising ammonia and sulfur oxides. These gases can be supplied to a scrubber to produce ammonium sulfate and sulfuric acid for leaching the clay. The gases are scrubbed and recovered according to the following equation:

$$2NH_3 + 4SO_3 + 7H_2O = (NH_4)_2SO_4 + 3H_2SO_4 + 3H_2O \quad (4)$$

Both sulfuric acid and ammonium sulfate are regenerated and recycled. Hence, purchased reagents are required only to make up process losses.

In another embodiment of the process of the invention ammonium ions for formation of the ammonoalunite are provided in the alumunous solution in the form of ammonium hydroxide.

Under these conditions, equation (2) above becomes:

$$3Al_2(SO_4)_3 + 2NH_4OH + 10H_2O = 2NH_4Al_3(SO_4)_2(OH)_6 + 5H_2SO_4 \quad (2A)$$

Also, equation (4) above may notionally be rewritten:

$$2NH_3 + 4SO_3 + 7H_2O = 2NH_4OH + 4H_2SO_4 + 3H_2O \quad (4A)$$

It can be seen that equations (1), (2A), (3) and (4A) form a balanced closed system.

This embodiment improves the precipitation of ammonoalunite by two means; less acid is formed than in equation (2) improving the yield of ammonoalunite and any excess ammonium hydroxide reacts with the acid produced thereby increasing reaction to the right in equation (2A).

Ammonium hydroxide may be provided in the autoclave feed in two ways. Firstly in the clay leach step or secondly by introduction into the aluminous solution after clay leach and before autoclaving.

In the first method, liquor from the precipitation of the ammonoalunite and scrubbed gases from the decomposition of the ammonoalunite are recycled to clay leach as described above, but the sulfate in the leach liquor is balanced with the alumuna in the clay so that excess ammonia in the leach liquor forms ammonium hydroxide.

In the second method, the gases from decomposition of the ammonoalunite are separated. As the ammonoalunite is heated the ammonia may be collected first and separated from the sulfur gases which are collected subsequently. By this means liquor from the precipitation of the ammonoalunite and scrubbed sulfur gases from decomposition of the ammonoalunite are recycled to clay leach as before but the ammonia decomposition product is conveyed separately to be introduced to the alumunous solution after clay leach and before autoclaving, preferably between iron extraction and autoclaving. This method is preferred since it offers the best balance of optimising ammonoalunite yield and process economics.

The alumina obtained by decomposing the ammonoalunite may contain impurities, such as sodium and potassium. Impurities may be removed by washing with sulfuric acid, especially hot sulfuric acid, before drying the alumina, for example to provide product suitable for feed to an electrolytic cell for producing aluminum.

After washing the alumina, the sulfuric acid may also be used to treat the organic liquid which has been used to extract iron from the aluminum-containing liquor before autoclaving. In this impurity stripping step, the acid removes iron from the organic liquid which may then be re-used to extract iron from the aluminum liquor.

Hydrolysis reaction conditions and impurity control of the ammonoalunite process were examined in the laboratory. All precipitation experiments were batch tests and used synthetic solutions in a Parr pressure reactor. The composition of this feed liquor to the autoclave was maintained at an equivalent of 30 gpl $Al_2O_3$. For the precipitation studies the ammonia concentration was varied, but for the impurity removal studies the impurity concentration was maintained at: $Na_2O$ 0.1 gpl; $K_2O$ 0.075 gpl; and $P_2O_5$ 0.3 gpl.

The study of ammonoalunite precipitation focused on the effect of three variables: ammonia concentration, autoclave temperature and resulting pressure, and reaction time. These variables determine the yield that can be obtained at reasonable industrial operating conditions. The two variables found to affect the yield of ammonoalunite precipitant are concentration of ammonia relative to the alumina concentration and the autoclaving temperature. Two other variables that may affect ammonoalunite yield—alumina and sulfuric acid concentration in the feed solution—were not examined. Because this was a preliminary examination, normal operating values were used for these parameters in leach liquor—alumina concentration was maintained at 30 gpl $Al_2O_3$ and no excess $H_2SO_4$ was added.

The ammonia concentration in the autoclave feed solutions was varied relative to the alumina concentration. Molar concentration ratios of zero to three moles of ammonia per mole of dissolved alumina were tested and the results were presented in Table I and FIG. 2. The purpose in varying ammonia concentration was to see if high molar ratios of $NH_3$ to $Al_2O_3$ would drive the hydrolysis reaction to the right, increasing the ammonoalunite yield.

Figure 2:
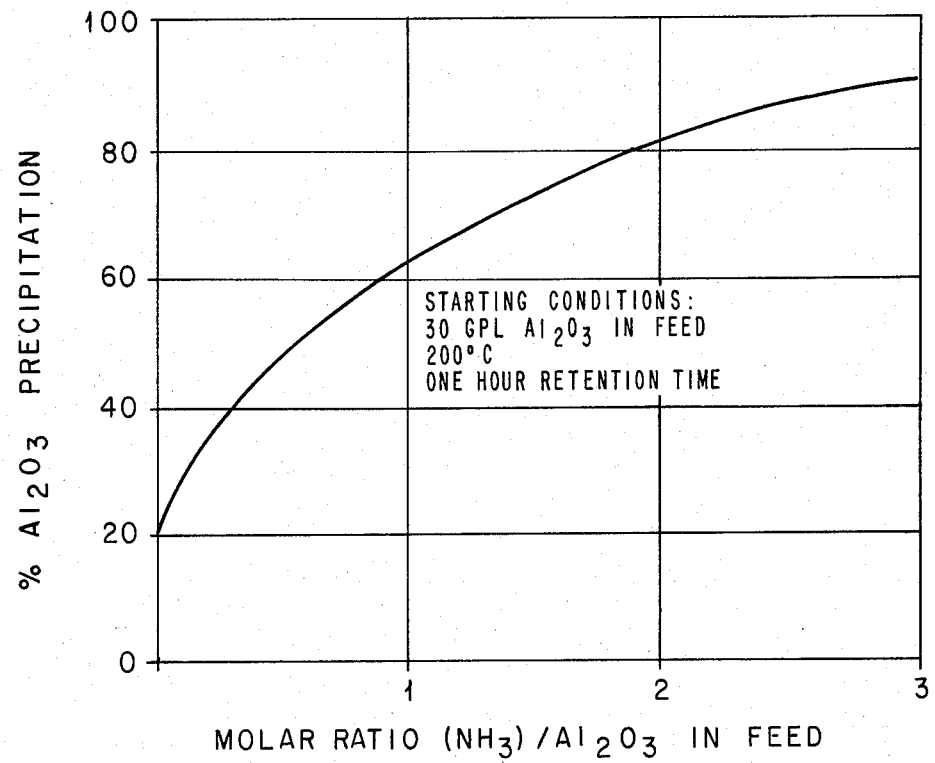

FIG. 2 shows that as the concentration of ammonia increases relative to the dissolved alumina concentration in the autoclave feed solution, the percentage of ammonoalunite precipitation increases. An ammonia-to-alumina molar concentration ratio of 3:1 precipitates 90 percent of alumina as ammonoalunite. As can be seen from FIG. 2, at the stoichiometric molar concentration ratio of 0.6:1, only 55 percent of the alumina contained in the feed precipitates as ammonoalunite.

TABLE I

ALUMINA RECOVERY VS $NH_3$ CONCENTRATION

| Test Description* | Product | Wt/Vol | gpl/% Assay $Al_2O_3$ | % Distribution** $Al_2O_3$ |
|---|---|---|---|---|
| No Ammonia added | Feed Solution | 1600 | 29.0 | 100.0 |
|  | Final Solution | 1590 | 23.7 | 81.2 |
|  | Solid Product | 20.2 | 35.1 | 18.8 |
| $NH_3$:$Al_2O_3$ | Feed Solution | 890 | 27.8 | 100.0 |
| mol ratio 0.33:1 | Final Solution | 865 | 16.1 | 56.3 |
|  | Solid Product | 32.2 | 35.4 | 43.7 |
| $NH_3$:$Al_2O_3$ | Feed Solution | 1500 | 31.1 | 100.0 |
| mol ratio 1:1 | Final Solution | 1460 | 12.4 | 38.8 |
|  | Solid Product | 71.3 | 38.0 | 61.2 |
| $NH_3$:$Al_2O_3$ | Feed Solution | 600 | 29.6 | 100.0 |
| mol ratio 2:1 | Final Solution | 570 | 5.77 | 18.5 |
|  | Solid Product | 36.1 | 33.0 | 81.5 |
| $NH_3$:$Al_2O_3$ | Feed Solution | 1600 | 24.0 | 100.0 |
| mol ratio 3:1 | Final Solution | 1560 | 2.46 | 10.0 |
|  | Solid Product | 121.9 | 36.0 | 90.0 |

*30 gpl $Al_2O_3$ Feed, 200° C., 1 hour retention time
**Based on solution assays and volumes Autoclave temperature was examined to determine if reasonable industrial operating temperatures and pressures could be used to precipitate ammonoalunite. Temperature was varied from 125° to 250° C. At these temperatures, the pressures varied from 35 to 575 psia (0.24 to 3.96 MPa). The results of this test work are given in Table II and FIG. 3. Phosphorus and potassium are more selectively precipitated than $Al_2O_3$ and sodium is also precipitated. These are the significant impurities coprecipitated with ammonoalunite.

Figure 3:
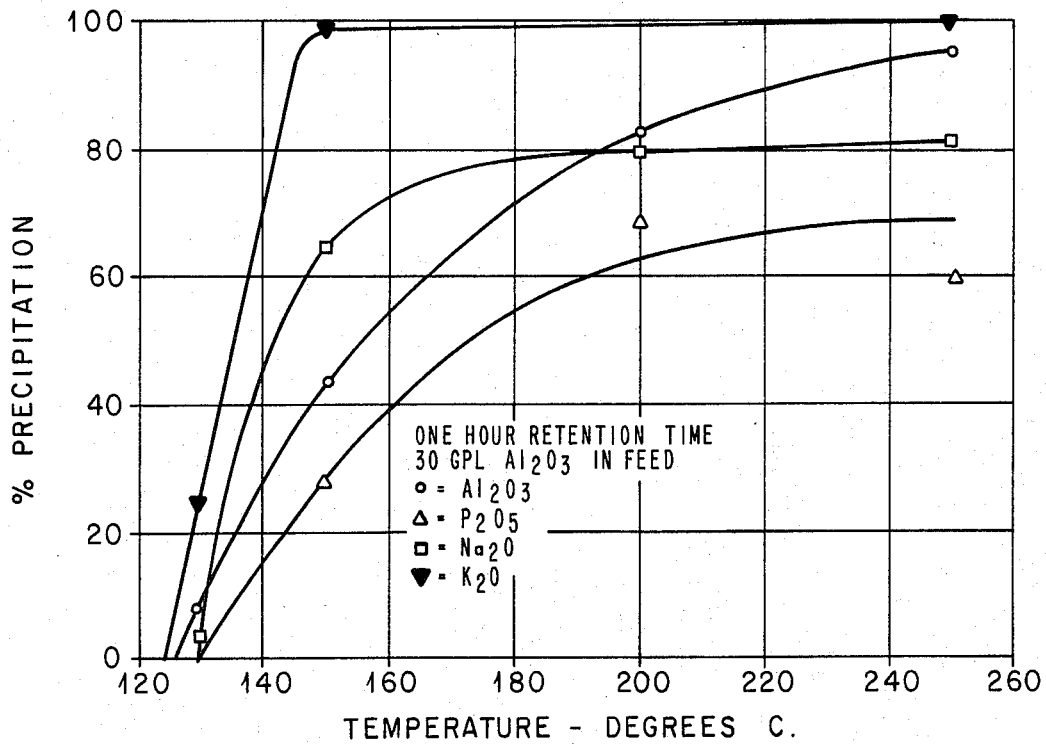

Autoclaving temperature is an important variable in ammonoalunite precipitation. The higher the autoclaving temperature, the higher the percentage of precipitation. FIG. 3 shows that 95 percent of the alumina contained in the solution can be precipitated at 250° C. The autoclaving pressure at 250° C. is 575 psia (3.96 MPa). Both the temperature and pressure are reasonable for an industrial process. However, it may be optimum in cost to use lower autoclave temperatures and a lower $NH_3/Al_2O_3$ ratio and accept a recovery of $Al_2O_3$ in ammonoalunite significantly lower than 95 percent. Because the residue liquor is recycled to the leach, all soluble $Al_2O_3$ not entrained with tailings will eventually be recovered in the precipitation autoclave.

TABLE II

ALUMINA RECOVERY VS HYDROLYSIS TEMPERATURE

| Test Description* | Product | Wt/Vol ml/g | gpl/% Assay | | | | Percent Distribution** | | | |
|---|---|---|---|---|---|---|---|---|---|---|
| | | | $Al_2O_3$ | $P_2O_5$ | $Na_2O$ | $K_2O$ | $Al_2O_3$ | $P_2O_5$ | $Na_2O$ | $K_2O$ |
| 130° C. | Feed Soln. | 4600 | 29.0 | .86 | .08 | .09 | 100 | 100 | 100 | 100 |
|  | Final Soln. | 4510 | 27.5 | .89 | .08 | .07 | 92.7 | 100 | 96.9 | 75.2 |
|  | Solid Product | 6.89 | 29.8 | — | | .11 | 7.3 | — | 3.1 | 24.8 |
| 150° C. | Feed Soln. | 600 | 32.6 | .24 | .124 | .106 | 100 | 100 | 100 | 100 |
|  | Final Soln. | 578 | 19.4 | .18 | .046 | .001 | 57.1 | 72.2 | 35.6 | 0 |
|  | Solid Product | 19.3 | 31.2 | .16 | .13 | .17 | 42.9 | 27.8 | 64.4 | 99+ |

TABLE II-continued

ALUMINA RECOVERY VS HYDROLYSIS TEMPERATURE

| Test Description* | Product | Wt/Vol ml/g | gpl/% Assay | | | | Percent Distribution** | | | |
|---|---|---|---|---|---|---|---|---|---|---|
| | | | $Al_2O_3$ | $P_2O_5$ | $Na_2O$ | $K_2O$ | $Al_2O_3$ | $P_2O_5$ | $Na_2O$ | $K_2O$ |
| 200° C. | Feed Soln. | 600 | 29.6 | .38 | .06 | .4 | 100 | 100 | 100 | 100 |
| | Final Soln. | 570 | 5.77 | .08 | .014 | .001 | 18.5 | 31.9 | 21.4 | 0 |
| | Solid Product | 36.1 | 33.0 | .43 | — | .68 | 81.5 | 68.1 | 78.6 | 99+ |
| 250° C. | Feed Soln. | 1600 | 26.8 | .24 | .078 | .192 | 100 | 100 | 100 | 100 |
| | Final Soln. | 1560 | 1.28 | .10 | .046 | .002 | 4.7 | 40.7 | 20.0 | 0 |
| | Solid Product | 115.0 | 36.1 | .13 | — | — | 95.3 | 59.3 | 80.0 | 99+ |

*30 gpl $Al_2O_3$ Feed 1 hour retention time, $NH_3/Al_2O_3$ mol ratio 2:1
**Based on solution assays Hydrolysis reaction time was also examined to determine if reasonable industrial conditions could be used to precipitate ammonoalunite. The time was varied from ½ hour to 3 hours. Because the tests were performed in a batch reactor, the reaction time is not necessarily representative of what would occur in a continuous industrial reactor. These results are presented in Table III and FIG. 4.

Figure 4:
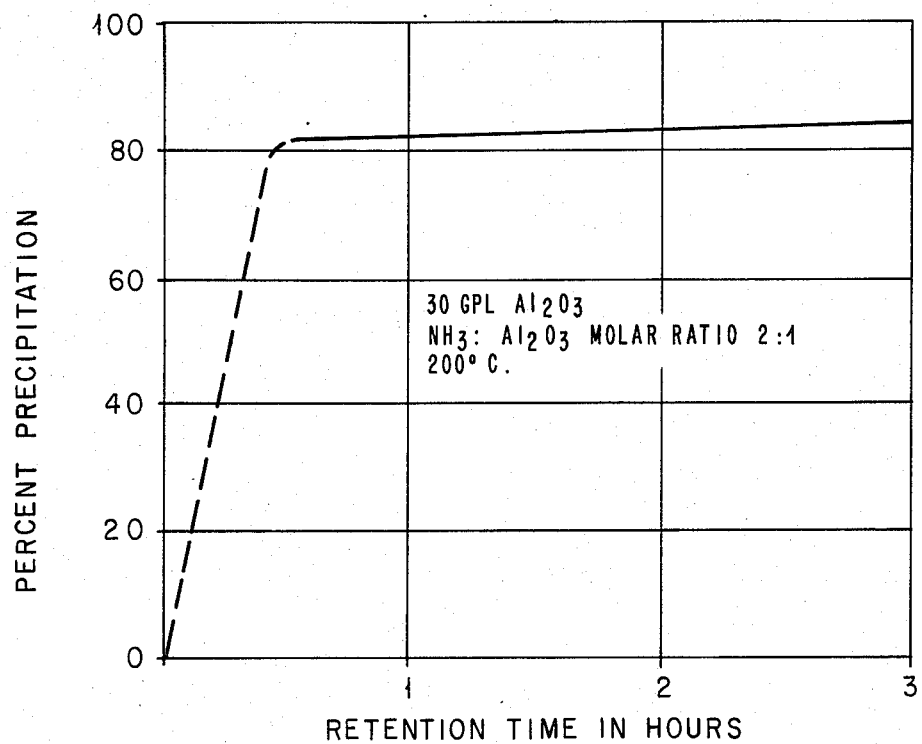

The time and percentage of precipitation relationships presented in FIG. 4 show that the hydrolysis reaction is very rapid. At 200° C., 81 percent of the ammonoalunite precipitated within one-half hour. Only 83 percent had precipitated by the end of three hours. Hence, ½ hour residence time is adequate and economics may indicate a shorter residence time.

TABLE III

ALUMINA RECOVERY VS RETENTION TIME IN AUTOCLAVE

| Test Description | Product | Wt/Vol | gpl/% Assay $Al_2O_3$ | % Distribution $Al_2O_3$ |
|---|---|---|---|---|
| 30 min. | Feed Solution | 1600 | 26 | 100.0 |
| | Final Solution | 1560 | 5.3 | 19.9 |
| | Solid Product | 115.0 | 34.5 | 80.1 |
| 60 min. | Feed Solution | 600 | 29.6 | 100.0 |
| | Final Solution | 510 | 5.77 | 18.5 |
| | Solid Product | 36.1 | 33.0 | 81.5 |
| 180 min. | Feed Solution | 1600 | 26.6 | 100.0 |
| | Final Solution | 1560 | 4.64 | 17.0 |
| | Solid Product | 136.3 | 34.1 | 83.0 |

200° C. Hydrolysis temp.
$NH_3/Al_2O_3$ mole ratio 2:1

A problem which occurs with increasing the ammonia/alumina concentration ratio is that the solubility of ammonium alum decreases. Ammonium alum crystallizes according to the following reaction:

$$(NH_4)_2SO_4 + Al_2(SO_4)_3 + 24H_2O = 2NH_4Al(SO_4)_2 \cdot 12H_2O \quad (5)$$

Figure 5:
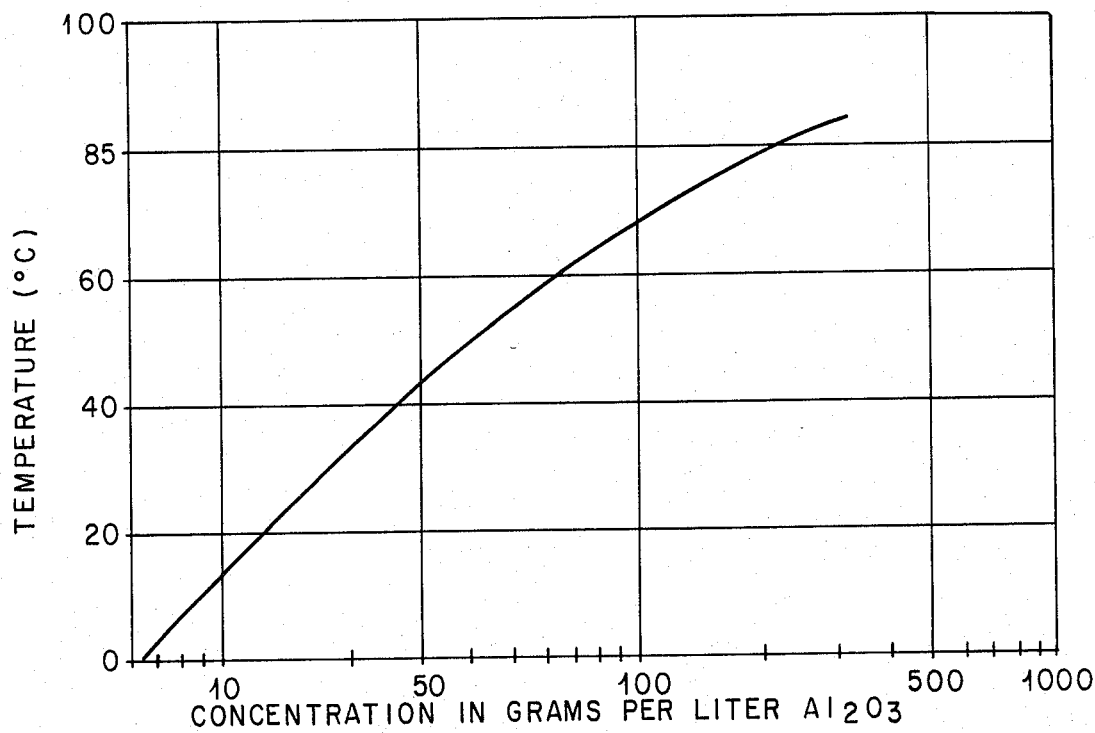

Ammonium alum crystallized from solution prior to autoclaving would result in an alumina loss. To prevent crystallization of ammonium alum, the solution must be kept hot. FIG. 5 shows the solubility of ammonium alum as a function of temperature for solutions with a molar $NH_3:Al_2O_3$ ratio of 2:1. (Atherton Seidell), *Solubilities of Inorganic and Metal Organic Compounds*, 4th ed., rev. William F. Liuke, Washington, D.C.: American Chemical Society, 1958 pp. 223-224.

The impurity concentration used in making up the synthetic leach liquor used for the autoclave precipitation experiments was derived from known analyses of the feed clay and from extraction efficiencies obtained in prior laboratory work on sulfuric acid leaching of clay. The impurity concentrations in this synthetic leach liquor were shown in Table II. Three methods of impurity removal were tested in the laboratory. These methods are:

(1) Precipitate the impurities prior to hydrolysis.
(2) Remove impurities by washing the ammonoalunite precipitate.
(3) Remove impurities by washing the alumina product.

The results for this test work are presented in Tables IV and V.

TABLE IV

IMPURITY REMOVAL BY PRECIPITATION

| Test Description | Product | Wt/Vol ml/g | gpl/% Assay | | | | Percent Distribution | | | |
|---|---|---|---|---|---|---|---|---|---|---|
| | | | $Al_2O_3$ | $P_2O_5$ | $Na_2O$ | $K_2O$ | $Al_2O_3$ | $P_2O_5$ | $Na_2O$ | $K_2O$ |
| 130° C., 1 hour retention time | Feed Soln. | 4600 | 29.0 | .86 | .08 | .09 | 100 | 100 | 100 | 100 |
| | Final Soln. | 4510 | 27.5 | .89 | .08 | .07 | 92.7 | 100 | 96.9 | 75.2 |
| | Solid Product | 6.9 | 29.5 | — | — | .11 | 7.3 | 0 | 3.1 | 24.8 |
| 135° C., 1 hour retention time | Feed Soln. | 600 | 28.2 | .42 | .072 | .48 | 100 | 100 | 100 | 100 |
| | Final Soln. | 578 | 24.4 | .28 | .050 | .11 | 83.3 | 64.2 | 66.9 | 19.3 |
| | Solid Product | 4.5 | 30.1 | .79 | .15 | 4.43 | 16.7 | 35.8 | 33.1 | 80.7 |
| 135° C., 40 min. retention time | Feed Soln. | 1500 | 34.0 | .22 | .11 | .078 | 100 | 100 | 100 | 100 |
| | Final Soln. | 1474 | 30 | .08 | .09 | .002 | 86.7 | 64.3 | 76.8 | 2.8 |
| | Solid Product | 6.4 | 32.8 | — | .28 | 1.81 | 13.3 | 35.7 | 23.2 | 97.2 |
| 135° C., 2 hour retention time | Feed Soln. | 1500 | 30.8 | .20 | .094 | .004 | 100 | 100 | 100 | 100 |
| | Final Soln. | 1464 | 24.8 | .10 | .046 | .001 | | | | |
| | Solid Product | 31.9 | 32.0 | .15 | — | .20 | 21.4 | 51.2 | 52.3 | 99+ |

TABLE V

IMPURITY REMOVAL BY LEACHING

| Test Description | Product | Wt/Vol | gpl/% Assay | | | | Percent Distribution | | | |
|---|---|---|---|---|---|---|---|---|---|---|
| | | | $Al_2O_3$ | $P_2O_5$ | $Na_2O$ | $K_2O$ | $Al_2O_3$ | $P_2O_5$ | $Na_2O$ | $K_2O$ |
| Ammonoalunite Leach 1 Hour at 75° C. in | Feed | 25 g | 37.6 | .19 | .14 | .19 | No Leaching Occurred | | | |
| | Leach Sol'n | 480 ml | .01 | .01 | .001 | .001 | | | | |

TABLE V-continued

| | | | gpl/% Assay | | | | Percent Distribution | | | |
|---|---|---|---|---|---|---|---|---|---|---|
| Test Description | Product | Wt/Vol | Al$_2$O$_3$ | P$_2$O$_5$ | Na$_2$O | K$_2$O | Al$_2$O$_3$ | P$_2$O$_5$ | Na$_2$O | K$_2$O |
| Deionized Water | Leach Residue | 25 g | 37.2 | .20 | .15 | .22 | | | | |
| Ammonoalunite Leach | Feed | 46 | 38.4 | .21 | .26 | .16 | 100.0 | 100.0 | 100.0 | 100.0 |
| 1 Hour at 75° C. in | Leach Sol'n | 152 | 10.3 | .06 | .016 | .013 | 8.9 | 9.4 | 2.0 | 2.7 |
| 2 N H$_2$SO$_4$ | Leach Residue | 45.2 | 32.5 | .17 | .073 | .17 | 91.9 | 90.6 | 98.0 | 97.3 |
| Alumina Leach | Feed | 39.5 | | .18 | .3 | .16 | 100.0 | 100.0 | 100.0 | 100.0 |
| 1 Hour at 75° C. in | Leach Sol'n | 188 | .023 | .05 | .026 | .061 | .01 | 13.1 | 34.9 | 73.1 |
| Deionized Water | Leach Residue | 38.6 | | .16 | .2 | .044 | 99.99 | 86.9 | 65.1 | 26.9 |
| Alumina Leach | Feed | 39.0 | | .24 | .4 | .2 | 100.0 | 100.0 | 100.0 | 100.0 |
| 1 Hour at 75° C. in | Leach Sol'n | 198 | 4.6 | .39 | .2 | 1.21 | 2.4 | 67.4 | 51.0 | 86.3 |
| 2 N H$_2$SO$_4$ | Leach Residue | 38.2 | | .08 | .2 | .028 | 97.6 | 32.6 | 49.0 | 13.7 |
| Alumina Leach | Feed | 35 | | .2 | .5 | .27 | 100.0 | 100.0 | 100.0 | 100.0 |
| 2 Hours at 98° C. in | Leach Sol'n | 190 | .16 | .28 | .22 | .25 | .9 | 77.9 | 42.4 | 39.6 |
| Deionized Water | Leach Residue | 33.6 | | .046 | .4 | .17 | 99.1 | 22.1 | 57.6 | 60.4 |
| Alummina Leach | Feed | 35 | | .2 | .5 | .27 | 100.0 | 100.0 | 100.0 | 100.0 |
| 2 Hours at 98° C. in | Leach Sol'n | 186 | 4.12 | .42 | .36 | .69 | 2.2 | 100.0 | 90.6 | 96.6 |
| 2 N H$_2$SO$_4$ | Leach Residue | 33 | | .01 | .05 | .01 | 97.8 | 0 | 9.4 | 3.4 |

Ammonoalunite precipitation is a fairly selective reaction, but there are impurities extracted during the leaching process that will precipitate with ammonoalunite. Because purity of the alumina product is important in determining process feasibility, solutions were made containing the major contaminants found in clay.

Firstly, potassium, sodium and phosphorus start to precipitate at lower autoclave temperatures. Complete selective precipitation of any of these compounds is not practicable. In the formation of alunites, potassium alunite starts to precipitate first, i.e., at the lowest temperature; then sodium alunite, ammonium alunite, and finally hydrogen alunite precipitate. N. I. Eremin, "Equations Describing the Hydrolysis of Aluminum Sulfates and Alums", Tsvetnye Metally, December 1968, pp. 71-76.

As can be seen from FIG. 3, 75 to 80 percent of the sodium, and 15 to 20 percent of the phosphorus, could be precipitated at 140° C.

Impurities were then leached from the ammonoalunite. As shown in Table V, leaching the precipitate with hot water had no effect. A hot acid leach removed 9 percent of the alumina and only a small portion of the impurities.

Impurity removal from the alumina, after thermal decomposition of ammonoalunite, appeared to be the most promising method of impurity removal. A hot water wash (98° C.) of the calcined alumina removed 80 percent of the P$_2$O$_5$ and 40 percent of the Na$_2$O and K$_2$O. When using sulfuric acid at two normal concentration and 98° C. to wash the calcined alumina, two percent of the alumina and essentially all of the impurities were removed. The hot H$_2$SO$_4$ wash is consequently the preferred purification method.

Figure 6:
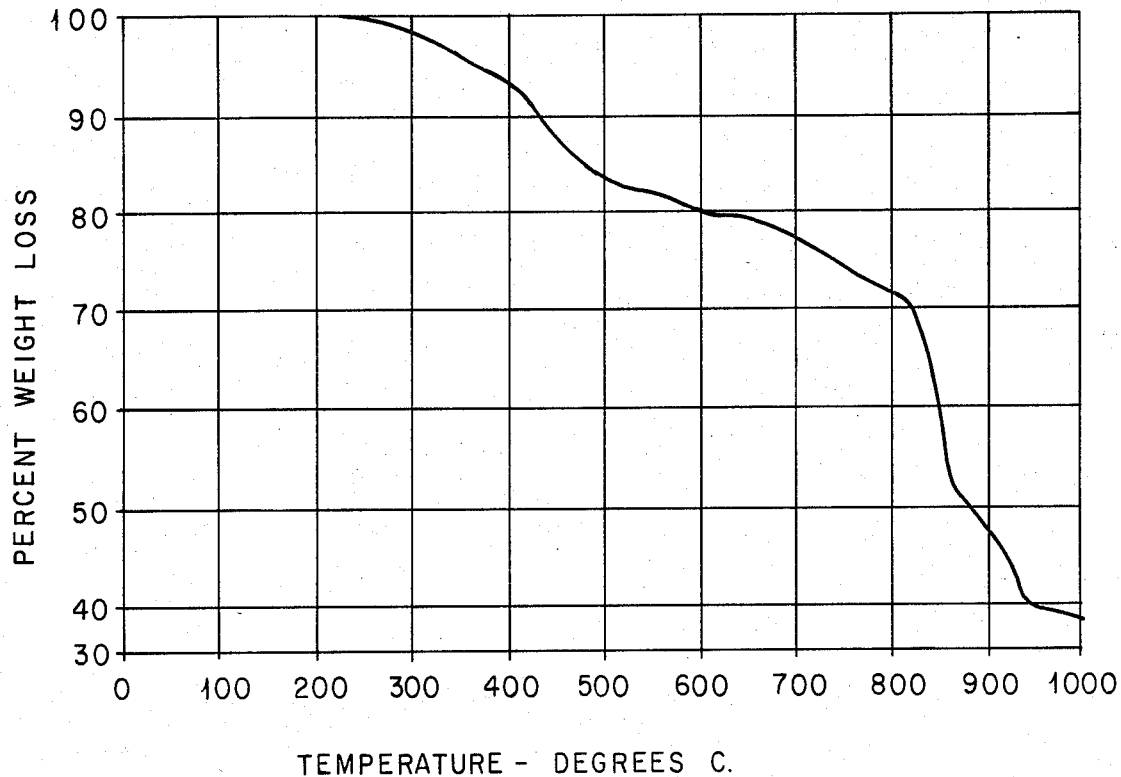

A thermal gravimetric analysis was run to determine the optimum decomposition temperatures. The results are shown in FIG. 6. 40 percent of the weight loss occurred between 300° and 500° C. This initial weight loss corresponds to ammonia and water being driven off. The remaining twenty percent weight loss occurred between 500° and 1000° C. This subsequent weight loss corresponds to the sulfur oxides being driven off.

The previous results show that the basic concept of the process, precipitation of ammonoalunite and production of a pure product, can be accomplished at reasonable operating conditions.

From thermodynamic calculations and thermogravimetric analysis, the ammonoalunite decomposition reactions include the following, in which the temperatures shown are approximate:

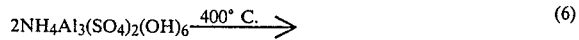

$$2NH_4Al_3(SO_4)_2(OH)_6 \xrightarrow{400° C.} \quad (6)$$

$$2Al_2O_3 + 6H_2O + 2NH_4Al(SO_4)_2$$

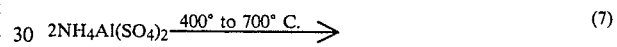

$$2NH_4Al(SO_4)_2 \xrightarrow{400° \text{ to } 700° C.} \quad (7)$$

$$2NH_3 + H_2O + SO_3 + Al_2(SO_4)_3$$

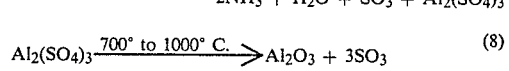

$$Al_2(SO_4)_3 \xrightarrow{700° \text{ to } 1000° C.} Al_2O_3 + 3SO_3 \quad (8)$$

What is claimed is:

1. A process for the production of alumina from an aluminous material comprising:
   (a) providing said aluminous material
   (b) leaching said aluminous material with an aqueous sulfuric acid solution to form a solid phase and a liquid phase containing aluminum sulfate;
   (c) separating said solid phase from said liquid phase;
   (d) reacting said liquid phase with ammonium ions at a temperature from about 150° to about 250° C. and a pressure from about 35 to about 575 psia to form an ammonoalunite precipitate, NH$_4$Al$_3$(5O$_4$)$_2$(OH)$_6$, and a liquid comprising sulfuric acid;
   (e) separating said ammonoalunite precipitate from said liquor;
   (f) thermally decomposing said ammonoalunite to produce said alumina and gaseous byproducts.

2. The process of claim 1, wherein the aluminous solution contains aluminum in an amount from 25-65 gpl, expressed as Al$_2$O$_3$.

3. The process of claim 1 wherein the mole ratio of ammonia to aluminum expressed as Al$_2$O$_3$ in said reacting step (d) is from 0.33:1 to 3:1.

4. The process of claim 3 wherein said mole ratio is from 1:1 to 3:1.

5. The process of claim 1 further comprising:
   recycling at least a portion of said sulfuric acid in said liquor formed in step (d) to leach said aluminous material in step (b).

6. The process of claim 1 further comprising:
   recycling a portion of said gaseous byproducts to leach the aluminous material in step (b).

7. The process of claim 1 further comprising:

treating said aluminous solution with an organic liquid substantially immiscible with the aluminous solution and containing an organic extractant capable of preferential extraction of iron over aluminum whereby iron is extracted from said aluminous solution into said organic liquid.

8. The process of claim 1 wherein at least a portion of said ammonium ions are supplied by ammonium hydroxide.

9. The process of claim 1 wherein said alumina is treated with hot sulfuric acid to remove impurities.

10. The process of claim 1 further comprising extracting iron from said aluminous solution.

11. The process of claim 1 further comprising one or more steps for extracting impurities selected from the group consisting of potassium and sodium to minimize said impurities in said alumina.

12. The process of claim 1 wherein the aluminous material comprises an aluminum-containing silicate.

13. The process of claim 12 wherein the aluminous material comprises a clay.

14. The process of claim 13 wherein the aluminous material comprises a clay which is calcined before leaching.

15. A process for the production of alumina from an aluminous material comprising:
 (a) providing said aluminous material
 (b) leaching said aluminous material with an aqueous solution comprising sulfuric acid and ammonium sulfate to extract aluminum from said material into said solution as aluminum sulfate and thereby form a liquid phase comprising an aluminous solution containing ammonium ions and a solid phase;
 (c) separating said solid phase from said liquid phase;
 (d) subjecting said liquid phase to a temperatue from about 150° to about 250° C. and a pressure ffrom about 35 to about 575 psia to form ammonoalunite precipitate, $NH_4Al_3(SO_4)_2(OH)_6$, and a liquor containing sulfuric acid;
 (e) thermally decomposing said ammonoalunite to form alumina and ammonia and sulfur trioxide gases;
 (f) scrubbing said ammonia and said sulfur trioxide gases to form ammonium sulfate and sulfuric acid;
 (g) recycling said ammonium sulfate from step (f) for use in leaching said aluminous material; and
 (h) recycling said sulfuric acid from steps (d) and (f) for use in leaching said aluminous material.

* * * * *